United States Patent
Gustin et al.

(10) Patent No.: US 6,315,088 B1
(45) Date of Patent: Nov. 13, 2001

(54) SPRING-SET ELECTROMAGNETICALLY RELEASED BRAKE

(75) Inventors: David C. Gustin, Rockton, IL (US); Michael F. Leone, Sewell, NJ (US); Todd C. Pink; Dennis J. Nelson, both of Rockford, IL (US)

(73) Assignee: Warner Electric Technology, Inc., Richmond, VA (US)

( * ) Notice: Subject to any disclaimer, the term of this patent is extended or adjusted under 35 U.S.C. 154(b) by 0 days.

(21) Appl. No.: 09/379,686

(22) Filed: Aug. 24, 1999

(51) Int. Cl.⁷ ............................... B60L 7/00; B60T 13/04
(52) U.S. Cl. ............................ 188/161; 188/171; 192/90
(58) Field of Search ............................... 192/84.8, 90, 75; 188/171, 166, 161, 162, 163, 164; 336/65, 90, 92, 198, 196; 335/281, 782; 242/118, 118.41, 118.6, 118.61, 118.62

(56) References Cited

U.S. PATENT DOCUMENTS

| | | | |
|---|---|---|---|
| 3,685,622 | * 8/1972 | Baer et al. | 192/84.8 |
| 4,206,837 | * 6/1980 | Brown et al. | 192/90 |
| 4,210,890 | 7/1980 | Olsen | 335/281 |
| 4,271,948 | * 6/1981 | Yew | 192/84.8 |
| 4,515,251 | * 5/1985 | Wruk | 188/171 |
| 5,244,060 | * 9/1993 | Tanaka et al. | 187/20 |
| 5,250,921 | 10/1993 | Van Laningham et al. | 335/296 |
| 5,331,246 | 7/1994 | Baronosky | 310/194 |
| 5,341,117 | * 8/1994 | Singbartl | 336/92 |
| 5,354,012 | * 10/1994 | Vincent | 242/118.41 |
| 5,361,057 | * 11/1994 | Ito et al. | 336/198 |
| 5,415,362 | 5/1995 | Lorenzo | 242/608.6 |
| 5,464,171 | * 11/1995 | Ripplinger | 242/118.61 |
| 5,600,294 | 2/1997 | Buenconsejo et al. | 336/192 |
| 5,661,447 | 8/1997 | Egawa et al. | 335/299 |
| 5,670,925 | * 9/1997 | Gibbs | 336/198 |
| 5,742,159 | 4/1998 | Babin et al. | 324/173 |
| 5,844,459 | * 12/1998 | Larsen | 336/92 |
| 5,886,438 | 3/1999 | Kawanishi | 310/90 |
| 5,892,312 | 4/1999 | Hazelton et al. | 310/194 |

* cited by examiner

Primary Examiner—Robert J. Oberleitner
Assistant Examiner—Robert A. Siconolfi
(74) Attorney, Agent, or Firm—Dykema Gossett PLLC (57) ABSTRACT

A spring-set, electromagnetically released brake that requires a relatively small amount of current to release is provided. The brake includes a magnet shell disposed about a first axis. The shell includes a radially outwardly extending pole. The brake also includes an armature disposed radially outwardly of the pole and pivotable at a first axial end and a first engagement element, such as a brake shoe, coupled to the armature proximate a second axial end of the armature. The brake further includes a spring disposed about the pole. The spring biases the armature radially outwardly to urge the first engagement element towards a second engagement element such as a friction surface in a brake drum. Finally, the brake includes a coil disposed about the pole and means for selectively energizing the coil to urge the armature radially inwardly and the first engagement element away from the second engagement element. A bobbin for use in the brake is also provided. The bobbin includes a substantially cylindrical body portion disposed about a second axis and first and second discs extending radially outwardly from first and second ends, respectively, of the body portion. The bobbin further includes a flange extending radially inwardly relative to the second axis and a projection extending axially relative to the second axis. The flange and projection are configured to engage the magnet shell and prevent radial and axial movement of the bobbin and coil.

26 Claims, 4 Drawing Sheets

SPRING-SET ELECTROMAGNETICALLY RELEASED BRAKE

BACKGROUND OF THE INVENTION

1. Field of the Invention

This invention relates to brakes and, in particular, to a spring-set, electromagnetically released brake requiring a relatively small amount of current for use in releasing the brake. This invention also relates to an improved coil bobbin for use in the inventive brake or other electromagnetic assembly and, in particular, to a coil bobbin that may be secured against movement within an electromagnetic assembly without bonding.

2. Disclosure of Related Art

A conventional spring-set, electromagnetically released brake includes an armature on which a brake shoe or other engagement element is disposed. A spring biases the armature and the engagement element towards a second engagement element, such as a friction surface. The brake further includes a coil disposed about a magnet pole or other ferromagnetic structure and means for energizing the coil. By energizing the coil, a magnetic circuit is established between the pole and armature in order to draw the armature towards the pole and the brake shoe away from the friction surface, thereby releasing the brake.

Conventional spring-set, electromagnetically released brakes often require relatively large amounts of current in order to overcome the biasing force of the spring and release the brake. As a result, these conventional brakes are relatively inefficient. Further, conventional spring-set, electromagnetically released brakes suffer from an undesirable amount of backlash as the brake is set.

Conventional coil bobbins used for retaining the coil in spring-set, electromagnetically released brakes and other electromagnetic assemblies also have disadvantages. These bobbins are typically secured within the assembly by bonding to prevent movement of the bobbin and the coil. Bonding, however, is a relatively expensive and inefficient process.

There is thus a need for a spring-set, electromagnetically released brake and a coil bobbin that will minimize or eliminate one or more of the above-mentioned deficiencies.

SUMMARY OF THE INVENTION

The present invention provides a spring-set, electromagnetically released brake as well as a coil bobbin for use in such a brake or other electromagnetic assembly.

An object of the present invention is to provide a spring-set, electromagnetically released brake that requires less current to release the brake as compared to conventional brakes.

Another object of the present invention is to provide a coil bobbin for use in a brake or other electromagnetic assembly that will restrict movement of the bobbin—and the coil retained by the bobbin—without bonding to a magnet pole or other structure within the assembly.

In accordance with the present invention, one embodiment of a spring-set, electromagnetically released brake includes a magnet shell disposed about a first axis. The magnet shell may be configured to receive a motor shaft extending along the first axis and includes a radially outwardly extending pole. The brake also includes an armature disposed radially outwardly of the pole and pivotable at a first axial end. The armature may be mounted to the magnet shell at its first axial end by a pivot pin extending in a direction perpendicular to the first axis. The brake further includes a first engagement element, such as a brake shoe, coupled to the armature proximate a second axial end of the armature. The brake further includes a spring disposed about the magnet shell pole. The spring biases the armature radially outwardly to urge the first engagement element towards a second engagement element, such as the inner surface of a brake drum coupled to the motor shaft. Finally, the brake includes a coil disposed about the pole and means for selectively energizing the coil to urge the armature radially inwardly and the first engagement element away from the second engagement element.

The pivoting motion of the armature and the relative positions of the armature and magnet shell pole allow a brake in accordance with the present invention to operate more efficiently as compared to conventional spring-set, electromagnetically released brakes. In particular, because the armature pivots at its first axial end, the second axial end of the armature containing the engagement element will travel a greater radial distance as the armature moves between a set position and a release position than those portions of the armature intermediate the first and second axial ends. The magnet shell pole is preferably located such that the axial center of the pole is intermediate the first and second axial ends of the armature. As a result, the average radial distance between the magnet shell pole and the armature when the armature is in the set position is less than the radial distance traveled by the second axial end of the armature as the armature moves between the set and release positions. This positioning allows a relatively small level of current to be used to move the armature and release the brake because the magnet shell pole and armature are relatively close even when the armature is in the set position.

One advantage of a brake in accordance with the present invention is a reduction in the amount of backlash when the brake is set as compared to conventional brakes. This reduction may be accomplished in several ways. First, the first axial end of the armature may be secured on a pivot pin held between two mounting posts on the magnet shell. The pivot pin is perpendicular to the first axis and, therefore, the axis of rotation of the brake drum and motor shaft. This arrangement reduces backlash in either rotational direction. Second, the inventive brake may include: (i) a coupling shaft having a female end with an axially extending slit configured to receive a key on the motor shaft and (ii) a collar disposed radially outwardly of the female end of the shaft and configured to clamp onto the key of the motor shaft. Finally, where the engagement elements form teeth disposed on the armature and brake drum, backlash may be reduced by angular placement of multiple armatures and/or their teeth so that the teeth on one armature are configured to fully engage the teeth on the brake drum while the teeth on another armature are configured to partially engage the teeth on the brake drum.

Other advantages of the present invention may be obtained by using multiple magnet shell poles, armatures, springs and coils. The use of multiple springs allows a braking torque to be applied in the event of a failure in any one spring. The use of multiple poles and coils enables the brake to be operated using various input voltages. For example, if the coils are connected in parallel a first voltage can be used. If the coils are connected in series, a second voltage (twice that of the first voltage) may be used.

A brake in accordance with the present invention may further include a bobbin to retain the coil about the magnet shell pole. A coil bobbin in accordance with the present invention includes a substantially cylindrical body portion extending along a longitudinal axis and having first and second ends. The body portion may be disposed about the magnet shell pole. The bobbin further includes first and second discs extending radially outwardly from the first and second ends, respectively. The first and second discs receive the coil therebetween. In a first embodiment of a bobbin in accordance with the present invention, the cylindrical body portion includes a radially inwardly extending flange and the first disc includes an axially extending projection. The flange and projection are configured to be received within openings in, or secured against surfaces of, the magnet shell of the inventive brake. In a second embodiment of a bobbin in accordance with the present invention, the first disc includes an elastically deformable retention member extending axially from the first disc. The retention member terminates in a triangular flange that is configured to engage the magnet shell of the inventive brake. The inventive coil bobbin is not restricted, however, to use within the inventive brake. Rather, the bobbin may be used in a variety of electromagnetic assemblies.

A bobbin for an electromagnetic assembly in accordance with the present invention represents and improvement over conventional bobbins because the bobbin may be secured against axial and radial movement within the assembly without bonding. As a result, the cost and time required to install the bobbin is reduced.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
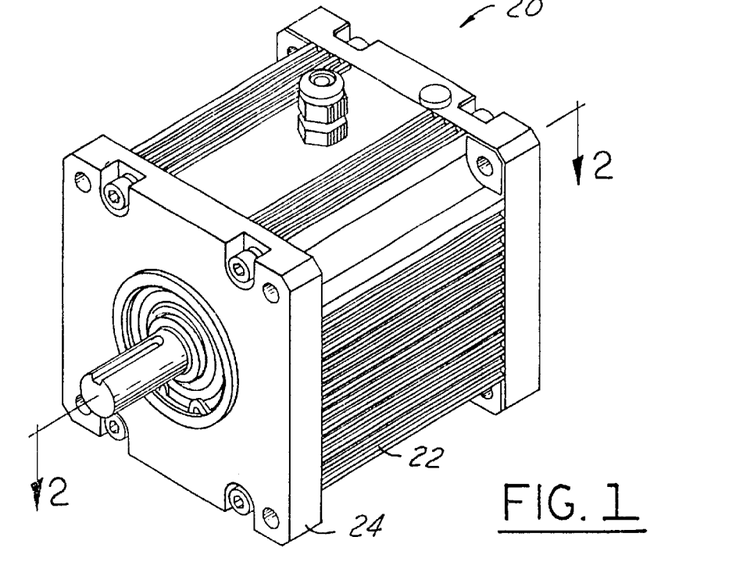
FIG. 1 is a perspective view of a first embodiment of a brake in accordance with the present invention.
Figure 2:
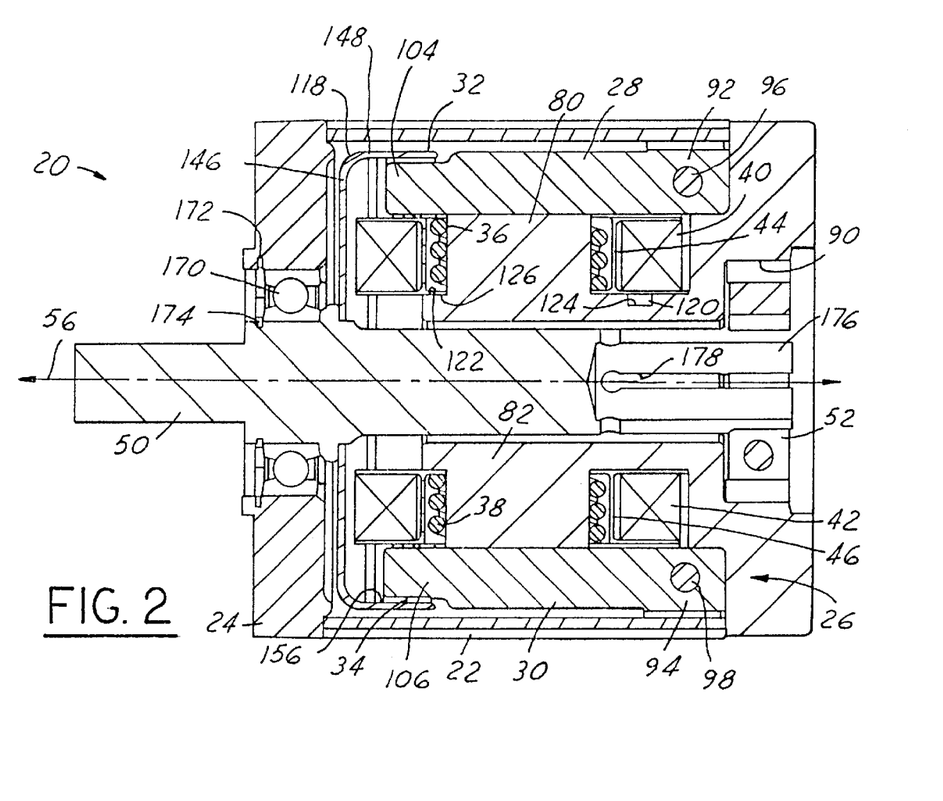
FIG. 2 is a cross-sectional view of the brake of FIG. 1 taken substantially along lines 2—2.
Figure 3:
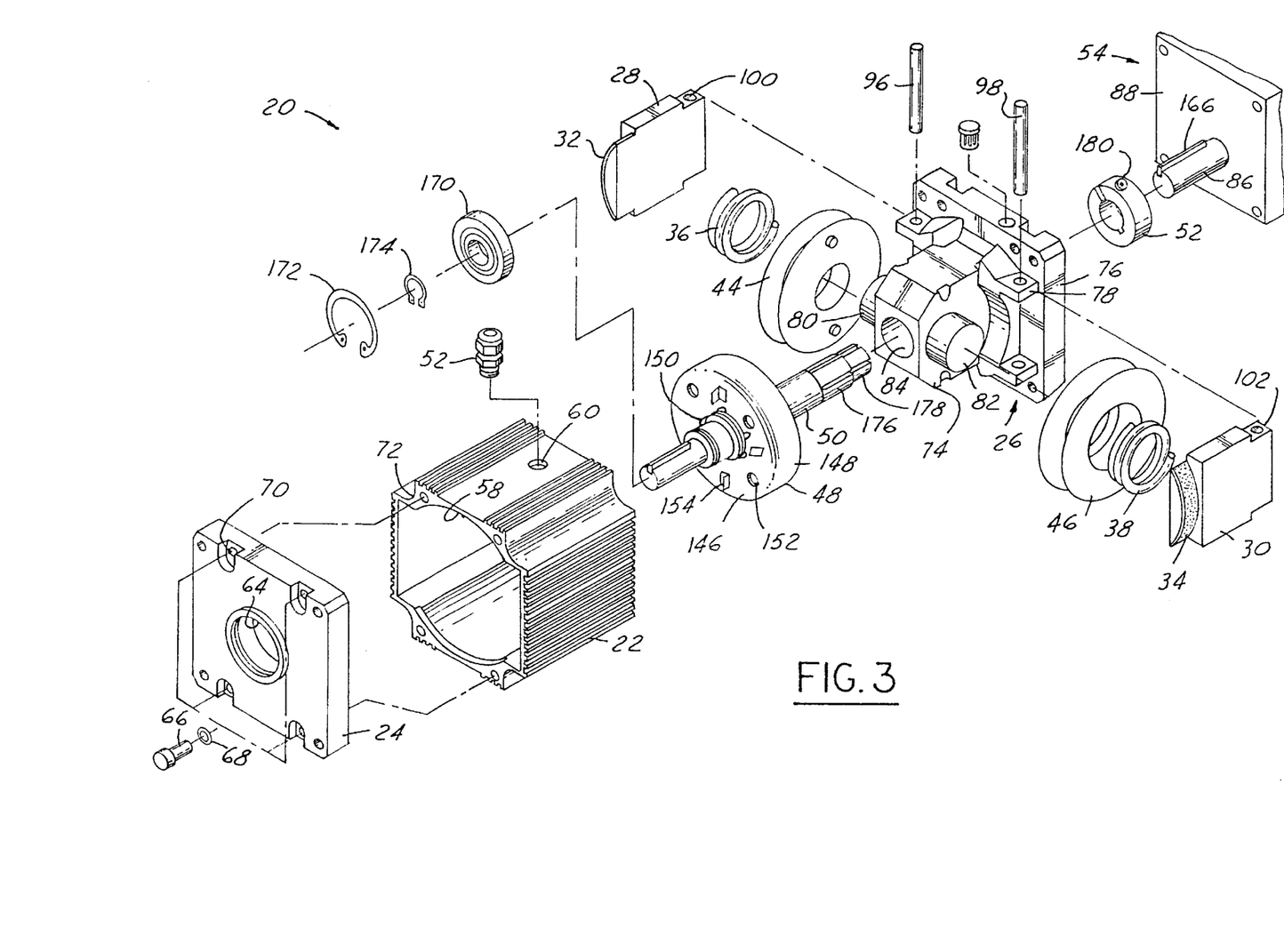
FIG. 3 is an exploded perspective view of the brake of FIG. 1.

Referring now to the drawings wherein like reference numerals are used to identify identical components in the various views, FIGS. 1–3 illustrate a brake 20 in accordance with a first embodiment of the present invention. Brake 20 includes a housing 22, and an endbell 24. In accordance with the present invention, brake 20 also includes the following elements: a magnet shell 26; armatures 28, 30; engagement elements, such as brake shoes 32, 34; springs 36, 38; coils 40, 42; means, such as a conventional power supply (not shown), for selectively energizing coils 40, 42; bobbins 44, 46; a brake drum 48; a brake shaft 50; and a collar 52. Referring to FIG. 3, brake 20 may be used in connection with a servo motor or stepper motor 54. It should be understood, however, that the application of brake 20 is not limited to such motors. Rather, brake 20 may be used with a wide variety of motors and in a wide variety of applications.

Referring to FIG. 1, housing 22 and endbell 24 are provided to protect the internal components of brake 20 from foreign objects and elements and to protect motor 54 or other objects and individuals in the event of a failure of brake 20. Housing 22 and endbell 24 also provide structural support to the components of brake 20. Housing 22 is conventional in the art and may be made from an aluminum alloy. Referring to FIG. 2, housing 22 may be centered about an axis 56. Referring to FIG. 3, the radially inner periphery of housing 22 defines a bore 58 sized to receive brake drum 48. Housing 22 includes an aperture 60 in which a conventional fluid tight connector 62 may be inserted to allow the introduction of lubricants to brake 20. Endbell 24 is also conventional in the art and may be made from an aluminum alloy. Referring to FIG. 2, endbell 24 may also be centered about axis 56. Referring again to FIG. 3, endbell 24 includes an aperture 64 through which brake shaft 50 may extend. Endbell 24 may be connected to housing 22 by inserting a plurality of screws 66 or other fastening means, together with washers 68, into corresponding apertures 70, 72 in endbell 24 and housing 22.

Figure 4:
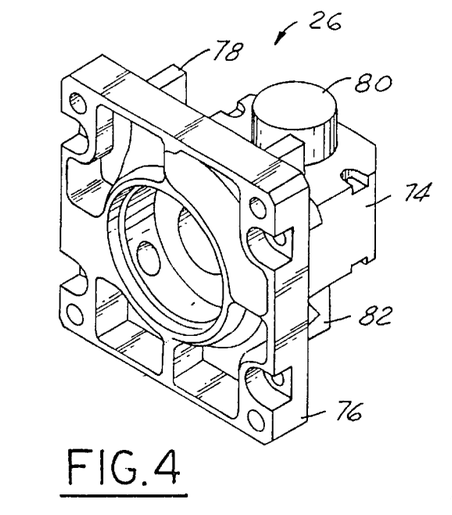
FIG. 4 is a perspective view of the magnet shell of the brake of FIG. 1.

Magnet shell 26 provides structural support for the components of brake 20 and forms part of a magnetic circuit used to selectively release brake 20. Shell 26 may be formed from a steel alloy or other ferromagnetic material and is disposed about axis 56. Referring to FIG. 4, shell 26 includes a body portion 74, a mounting flange 76, mounting posts 78, and poles 80, 82. Referring to FIG. 3, body portion 74 is received within bore 58 of housing 22 and includes a bore 84 through which brake shaft 50 and/or a shaft 86 of motor 54 may extend. Mounting flange 76 is integral with body portion 74 and is configured to secure brake 20 to housing 88 of motor 54 and housing 22 using screws or other conventional fasteners. Referring to FIG. 2, mounting flange 76 also provides a seat 90 for collar 52. Referring again to FIG. 4, mounting posts 78 are integral with body portion 74 and mounting flange 76 and are provided to secure armatures 28, 30 as described in greater detail hereinbelow. Poles 80, 82 are integral with, and extend radially outwardly from, body portion 74. Poles 80, 82 form part of a magnetic circuit used to selectively release brake 20 as described in greater detail hereinbelow. Although only two poles 80, 82 are shown in the illustrated embodiment, it should be understood that additional poles may be disposed about body portion 74 of shell 26. The use of shell 26 is advantageous with respect to conventional brakes, because shell 26 integrates several components into a single part. In particular, the integration of mounting flange 76 with body portion 74 eliminates the need to secure a separate endbell to housing 22.

Referring to FIG. 2, armatures 28, 30 are provided to move engagement elements (e.g., brake shoes 32, 34) into and out of engagement with a second set of engagement elements formed in or extending from the radially inner surface of brake drum 48 to thereby set and release brake 20. Armatures 28, 30 may be made from a steel alloy or other ferromagnetic material. Armatures 28, 30 are disposed radially outwardly of poles 80, 82 and extend longitudinally along axis 56. Armatures 28, 30 are each configured to pivot at a first axial end, 92, 94, respectively. Referring to FIG. 3, armatures 28, 30 may be supported on pivot pins, 96, 98, respectively, extending through apertures 100, 102 disposed proximate the first axial ends 92, 94 of armatures 28, 30. Pins 96, 98 may be supported within mounting posts 78 of magnet shell 26. Because pins 96, 98 extend in a direction perpendicular to axis 56—and therefore the axis of rotation of drum 48—and are held securely within mounting posts 78, backlash at the second axial ends 104, 106, of armatures 28, 30, respectively, in either rotational direction is reduced and/or eliminated. Ends 104, 106 of armatures 28, 30, respectively, may be curved and may be sized to fit radially inwardly of brake drum 48.

Figure 5:
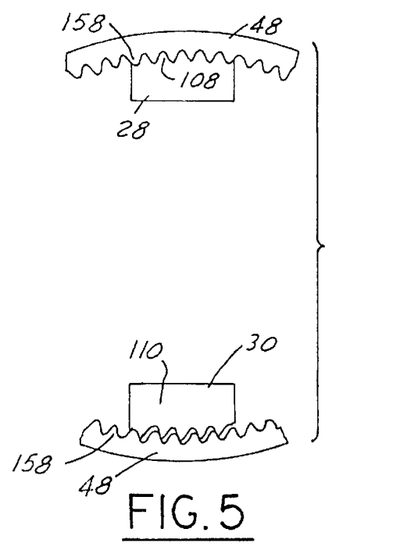
FIG. 5 is a plan view illustrating one embodiment of the engagement elements of the brake of FIG. 1.

The engagement elements disposed on armatures 28, 30 are provided to engage corresponding engagement elements formed in or extending from brake drum 48 in order to set brake 20. The engagement elements on armatures 28, 30 may comprise conventional brake shoes 32, 34. Alternatively, as shown in FIG. 5, the engagement elements may each comprise a plurality of teeth 108, 110 extending radially outwardly from armatures 28, 30. It should be understood, however, that the illustration of brakes shoes 32, 34 and teeth 108, 110 is exemplary only and that the engagement elements on armatures 28, 30 may take on a variety of forms known in the art. Brakes shoes 32, 34 and teeth 108, 110 may be disposed proximate the second axial ends 104, 106 of armatures 28, 30, respectively.

Springs 36, 38 are provided to bias armatures 28, 30, respectively, radially outwardly to thereby urge engagement elements on armatures 28, 30 towards the engagement elements on brake drum 48. Springs 36, 38 are conventional in the art and may be made from zinc plated music wire. Springs 36, 38 may be disposed about poles 80, 82 of shell 26. The use of multiple springs in brake 20 is advantageous because brake 20 will remain set in the event of a spring failure.

Coils 40, 42 are provided to selectively generate a magnetic circuit between poles 80, 82 of shell 26 and armatures 28, 30 in order to attract armatures 28, 30 radially inwardly and their engagement elements away from the engagement elements on brake drum 48. Coils 40, 42 are conventional in the art any may be disposed about poles 80, 82. Coils 40, 42 may be energized through lead wires (not shown) extending from a conventional power supply (not shown) through bobbins 44, 46. The use of multiple coils in brake 20 is advantageous because it allows the use of different input voltages. If coils 40, 42 are connected in parallel, a power supply having a first input voltage may be used to supply current to coils 40, 42. If coils 40, 42 are connected in series, a power supply having a second input voltage—twice that of the first input voltage—may be used to supply current to coils 40, 42.

Figure 6:
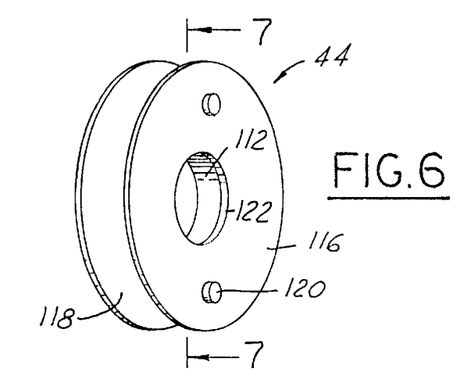
FIG. 6 is a perspective view of a first embodiment of a bobbin in accordance with the present invention.
Figure 7:
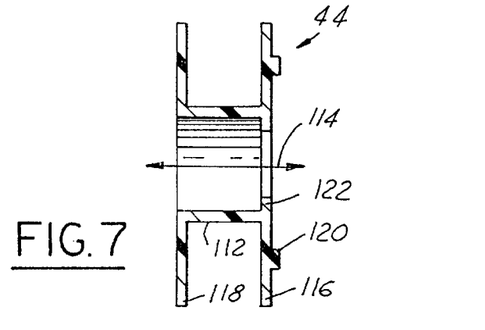
FIG. 7 is a cross-sectional view of the bobbin of FIG. 6 taken substantially along lines 7—7.

Bobbins 44, 46 are provided to retain coils 40, 42, respectively. In accordance with the present invention, bobbins 44, 46 are configured to be secured within apertures in, and/or against surfaces of, magnet shell 26 so that bobbins 44, 46—and coils 40, 42—may be secured against movement without bonding bobbins 44, 46 to magnet shell 26. Referring to FIGS. 6 and 7, one embodiment of a bobbin 44 in accordance with the present invention and for use in brake 20 is shown. Although FIGS. 6 and 7 illustrate only one bobbin 44 of bobbins 44, 46, it will be understood that bobbin 46 is substantially similar to the illustrated bobbin 44. Bobbin 44 may be made from glass-filled nylon and includes a cylindrical body portion 112 extending along a longitudinal axis 114. Bobbin 44 also includes a pair of discs 116, 118 extending radially outwardly from first and second ends of body portion 112. Discs 116, 118 may be integral with body portion 112. Disc 116 includes at least one projection 120 extending axially relative to axis 114. Projection 120 may be used to locate the lead wires (not shown) that supply current to the coil 40 retained by bobbin 44. Body portion 112 includes a radially inwardly extending flange 122. Flange 122 is annular and disposed about the entire radially inner periphery of body portion 112 in the illustrated embodiment. It should be understood, however, that flange 122 may extend about only an angular portion of the radially inner periphery of body portion 112. Flange 122 is preferably disposed at one end of body portion 112 and, in particular, at the end from which the disc 116 having projection 120 is disposed.

The inventive bobbin 44 represents an improvement as compared to conventional bobbins because bobbin 44—and the coil 40 it retains—may be secured against both axial and radial movement in brake 20 without bonding bobbin 44 to magnet shell 26. Referring to FIG. 2, projection 120 may be disposed within a recess 124 in magnet shell 26. Flange 122 may be urged against a surface 126 of body portion 74 of magnet shell 26 by spring 36. Because bobbin 44 may be secured to shell 26 without bonding, devices that include bobbin 44, such as brake 20, may be made more efficiently and less expensively.

Figure 8:
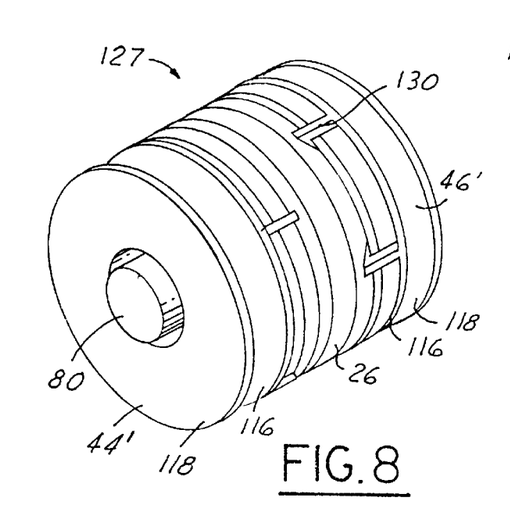
FIG. 8 is a perspective view of an electromagnetic assembly including a second embodiment of a bobbin in accordance with the present invention.
Figure 9:
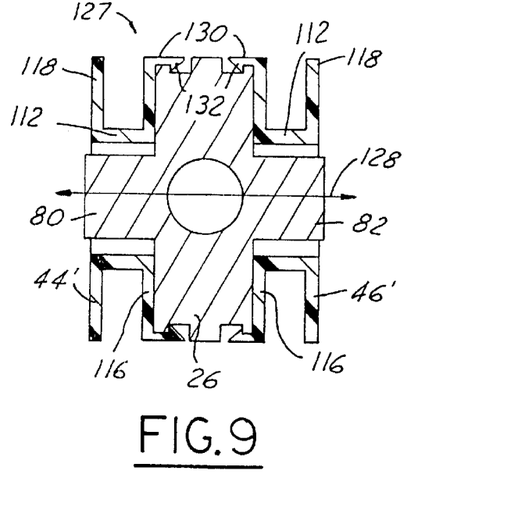
FIG. 9 is a cross-sectional view of electromagnetic assembly of FIG. 8.

Referring now to FIGS. 8 and 9, an electromagnetic assembly 127 incorporating bobbins 44', 46' in accordance with a second embodiment of the present invention is shown. Assembly 127 may form a portion of brake 20. Like bobbin 44, bobbins 44' and 46' include a body portion 112 disposed about an axis 128 and discs 116, 118. Bobbins 44', 46' further include retention members 130 extending axially relative to axis 128 from the radially outer perimeter of disc 116. Retention members 130 terminate in triangular flanges 132 and may be elastically deformable. Members 130 may be deflected radially outwardly relative to axis 128 as bobbins 44', 46' are placed over poles 80, 82 of magnet shell 26. Members 130 will then return to form to engage flanges extending from magnet shell 26. Like bobbin 44, bobbins 44', 46' represent an improvement with respect to conventional bobbins because bobbins 44', 46'—and the coils 40, 42 they retain—may be secured against axial and radial movement within brake 20 without bonding bobbins 44', 46' to shell 26.

Figure 10:
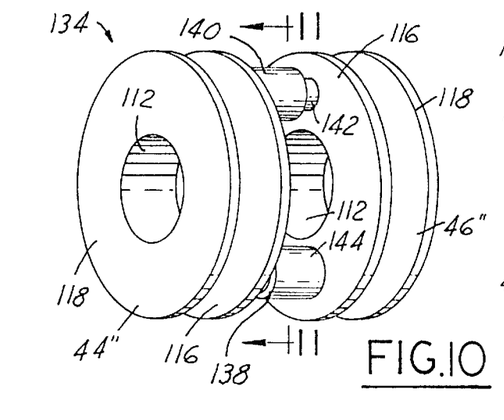
FIG. 10 is a perspective view of a bobbin assembly including a third embodiment of a bobbin in accordance with the present invention.
Figure 11:
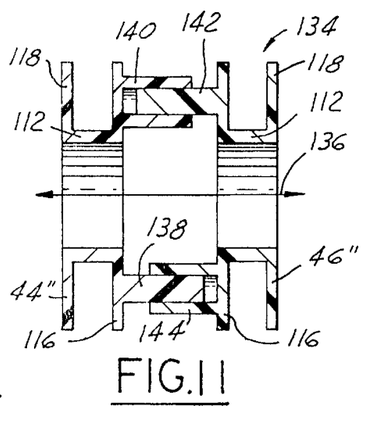
FIG. 11 is a cross-sectional view of the bobbin assembly of FIG. 10 taken substantially along lines 11—11.

Referring to FIGS. 10 and 11, a bobbin assembly 134 including bobbins 44" and 46" in accordance with a third embodiment of the present invention is shown. Assembly 134 may be used within brake 20 or other electromagnetic assemblies. Like bobbins 44 and 44' described hereinabove, each of bobbins 44", 46" includes a cylindrical body portion 112 disposed about an axis 136 and a pair of discs 116, 118. Bobbin 44" further includes a coupling pin 138 and a female coupling 140 extending in a first axial direction relative to axis 136 from disc 116. Pin 138 and coupling 140 are angularly spaced about disc 116 of bobbin 44" and are diametrically opposite in the illustrated embodiment. Bobbin 46" further includes a coupling pin 142 and a female coupling 144 extending in a second axial direction relative to axis 136 from disc 116. Pin 142 and coupling 144 are angularly spaced about disc 116 of bobbin 46" and are also diametrically opposite in the illustrated embodiment. Each of couplings 140, 144 is configured to receive a corresponding pin 142 and 138, respectively, therebetween. Both pins 138, 142 and couplings 140, 144 may extend through apertures (not shown) in magnet shell 26 that extend in a direction perpendicular to the axis 56 about which shell 26 is disposed. Like bobbins 44, 44', bobbins 44", 46" of assembly 134 represent an improvement with respect to conventional bobbins because each of bobbins 44", 46"—and the coils 40, 42 they retain—may be secured against axial and radial movement within brake 20 without bonding bobbins 44", 46" to shell 26.

Referring to FIGS. 2 and 3, brake drum 48 is provided as part of a means for setting brake 20. Drum 48 is conventional in the art and may be made of steel. Drum 48 may include an annular body portion 146 centered about axis 56 and an axially-extending skirt 148. Referring to FIG. 3, body portion 146 may include one or more curved recesses 150 at its radially inner perimeter to allow drum 48 to be mounted on brake shaft 50. Alternatively, drum 48 may be made integral with brake shaft 50. Portion 146 may also include one or more angularly spaced apertures 152 in order to reduce the weight of drum 48. Portion 146 may further include one or more fans 154 mounted thereto to aid in cooling brake 20. Fans 154, may alternatively be mounted to the radially outer surface of skirt 148. Drum 48 further includes an engagement element or elements that are provided to engage the engagement elements of armatures 28, 30 in order to set brake 20. Referring to FIG. 2, the engagement element may comprise the radially inner surface 156 of skirt 148. Surface 156 may act in a conventional manner to frictionally engage brakes shoes 32, 34. Referring to FIG. 5, the engagement element may alternatively comprise a plurality of teeth 158 extending radially inwardly from skirt 148 and configured to engage corresponding teeth 108, 110 disposed on armatures 28, 30. In the latter embodiment, either armatures 28, 30 or the teeth 108, 110 on armatures 28, 30 may be angularly offset so that, when brake 20 is set, one plurality of teeth 108, 110 is fully engaged with teeth 158 of drum 48, while another plurality of teeth 108, 110 is only partially engaged with teeth 158 of drum 48. This construction will further reduce backlash within brake 20 and also provides significant braking torque.

Figures 12, 13:
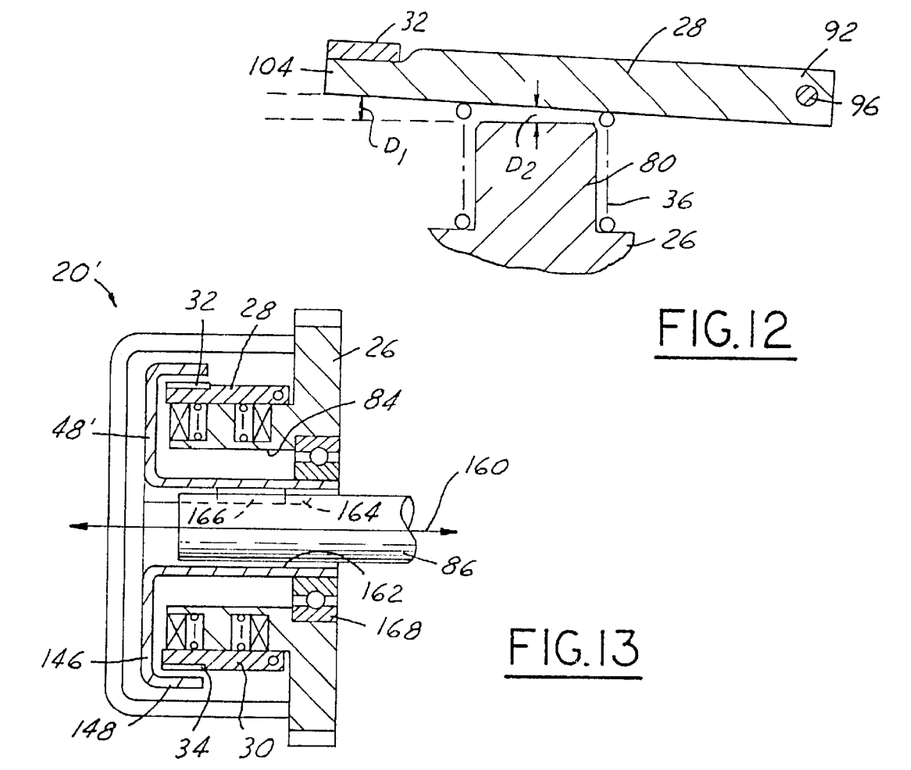
FIG. 12 is a partial cross-sectional view illustrating the operation of a brake in accordance with the present invention.
FIG. 13 is a cross-sectional view of a second embodiment of a brake in accordance with the present invention.

Referring now to FIG. 13, an alternative embodiment of a brake 20' in accordance with the present invention is illustrated. Brake 20' is similar to brake 20 described hereinabove, but includes a modified brake drum 48'. Like drum 48 described hereinabove, drum 48' includes a body portion 146 centered about an axis 160 and an axially extending skirt 148. Drum 48' further includes a substantially cylindrical mounting portion 162 extending axially from body portion 146 through bore 84 of magnet shell 26. Portion 162 may include a keyway 164 configured to receive a key 166 on motor shaft 86 in order to couple drum 48' to shaft 86 for rotation therewith. Drum 48' may be rotatably supported within bore 84 of shell 26 by bearings 168. Brake 20' offers several advantages relative to conventional brakes and even brake 20. First, brake 20' does not require the use of brake shaft 50 to transmit braking torque to motor shaft 86. Second, brake drum 48' provides bearing support for motor shaft 86. Third, brake 20' may be easily assembled with motor 54 by sliding drum 48' onto motor shaft 86 and bolting mounting flange 76 of magnet shell 26 to housing 88 of motor 54.

Referring again to FIG. 3 and a description of brake 20, brake shaft 50 is provided to transfer a braking torque to motor shaft 86. Shaft 50 may be made from steel or other conventional materials. Shaft 50 is preferably made of a ferromagnetic or other material having a low magnetic reluctance, however, in order to increase the strength of the magnetic circuit formed between poles 80, 82 of magnet shell 26 and armatures 28, 30 upon release of brake 20. For the same reason, the diameter of brake shaft 50 may be about equal to the diameter of bore 84 of magnet shell 26. Referring to FIGS. 2 and 3, shaft 50 may be centered about axis 56. Shaft 50 may include a plurality of lugs (not shown) configured to be received within recesses 150 of body portion 146 of brake drum 48 in order to couple drum 48 to shaft 50 for rotation therewith. Shaft 50 may be supported at one axial end within endbell 24 by bearings 170 secured by retainer clips 172, 174. A second axial end of shaft 50 may include a female coupling 176 having one or more axially extending slits 178. Slits 178 may be configured to receive key 166 of motor shaft 86 to rotatably couple brake shaft 50 and motor shaft 86. Through slits 178, coupling 176 allows axial movement of motor shaft 86 without effecting the performance of brake 20.

Referring to FIG. 3, collar 52 is provided to further reduce backlash in brake 20 and motor shaft 86 when brake 20 is set. Collar 52 is conventional in the art and includes a substantially circular piece of steel defining an aperture with means, such as a screw 180, for adjusting the size of the aperture. Referring to FIG. 2, collar 52 may be seated within mounting flange 76 of magnet shell 26 and may be disposed about coupling 176 of brake shaft 50 and key 166 of motor shaft 86. Collar 52 may be adjusted to clamp down upon key 166 of motor shaft 86 when brake 20 is installed.

In addition to the advantages discussed hereinabove, a brake in accordance with the present invention significantly improves upon conventional brakes in the efficient use of electrical power to release brake 20. As discussed hereinabove, and with reference now to FIG. 12, each of armatures 28, 30 is disposed radially outwardly of poles 80, 82 of shell 26 and is configured to pivot at a first axial end 92, 94. As a result, the second axial ends 104, 106 of armatures 28, 30 (which include the engagement elements) travel a greater radial distance $D_1$ than those portions of armatures 28, 30 intermediate ends 92, 94 and 104, 106, respectively. As long as the average radial distance $D_2$ between the radially outer surfaces of poles 80, 82 and the radially inner surfaces of armatures 28, 30 is less than the distance $D_1$ traveled by ends 104, 106 of armatures 28, 30, the current required to release brake 20 will be less than the current required if all portions of armatures 28, 30 traveled a uniform radial distance. This condition will be satisfied as long as the axial centers of poles 80, 82, relative to axis 56 are intermediate the first and second axial ends 92, 94 and 104, 106 of armatures 28, 30, respectively.

While the invention has been particularly shown and described with reference to the preferred embodiments thereof, it is well understood by those skilled in the art that various changes and modifications can be made in the invention without departing from the spirit and scope of the invention.

We claim:

1. A brake, comprising:

a magnet shell disposed about a first axis, said magnet shell including a radially outwardly extending pole;

an armature disposed radially outwardly of said pole;

a pivot pin connecting a first axial end of said armature to said magnet shell, said pivot pin extending along a second axis perpendicular to said first axis and said first axial end of said armature pivotable about said second axis;

a first engagement element coupled to said armature proximate a second axial end of said armature;

a spring disposed about said pole, said spring biasing said armature radially outwardly to urge said first engagement element towards a second engagement element;

a coil disposed about said pole; and means for selectively energizing said coil to urge said armature radially inwardly and said first engagement element away from said second engagement element.

2. The brake of claim 1, further comprising:

a bobbin disposed about said pole, said bobbin having
- a substantially cylindrical body portion extending along a second axis and having first and second ends; and
- first and second discs extending radially outwardly relative to said second axis from said first and second ends of said body portion, respectively;
- wherein said cylindrical body portion includes a flange extending radially inwardly relative to said second axis and said first disc includes a first projection extending axially relative to said second axis.

3. The brake of claim 1, further comprising:

a bobbin disposed about said pole, said bobbin having
- a substantially cylindrical body portion extending along a second axis and having first and second ends;
- first and second discs extending radially outwardly relative to said second axis from said first and second ends of said body portion, respectively; and,
- an elastically deformable retention member extending axially relative to said second axis from one of said first and second discs.

4. The brake of claim 1, further comprising a brake shaft extending axially within said magnet shell, said brake shaft having a relatively low magnetic reluctance.

5. The brake of claim 1, further comprising:

a brake shaft extending axially within said magnet shell, said brake shaft having a female coupling with an axially extending slit; and a collar disposed about said female coupling.

6. The brake of claim 1 wherein an axial center of said pole is intermediate said first and second axial ends of said armature.

7. The brake of claim 1 wherein said first engagement element comprises a plurality of teeth.

8. The brake of claim 1 wherein said first engagement element comprises a brake shoe.

9. A brake, comprising:

a magnet shell disposed about a first axis, said magnet shell including a radially outwardly extending pole;

an armature disposed radially outwardly of said pole and pivotable at a first axial end;

a first engagement element coupled to said armature proximate a second axial end of said armature;

a brake drum disposed radially outwardly of said armature, said brake drum including a second engagement element;

a spring disposed about said pole, said spring biasing said armature radially outwardly to urge said first engagement element towards said second engagement element;

a coil disposed about said pole; and means for selectively energizing said coil to urge said armature radially inwardly and said first engagement element away from said second engagement element.

10. The brake of claim 9, further comprising a pivot pin connecting said first axial end of said armature to said magnet shell, said pivot pin extending perpendicular to said first axis.

11. The brake of claim 9, further comprising:

a bobbin disposed about said pole, said bobbin having
- a substantially cylindrical body portion extending along a second axis and having first and second ends; and
- first and second discs extending radially outwardly relative to said second axis from said first and second ends of said body portion, respectively;
- wherein said cylindrical body portion includes a flange extending radially inwardly relative to said second axis and said first disc includes a first projection extending axially relative to said second axis.

12. The brake of claim 9, further comprising:

a bobbin disposed about said pole, said bobbin having
- a substantially cylindrical body portion extending along a second axis and having first and second ends;
- first and second discs extending radially outwardly relative to said second axis from said first and second ends of said body portion, respectively; and,
- an elastically deformable retention member extending axially relative to said second axis from one of said first and second discs.

13. The brake of claim 9, further comprising a brake shaft extending axially within said magnet shell, said brake shaft having a relatively low magnetic reluctance.

14. The brake of claim 9, further comprising:

a brake shaft extending axially within said magnet shell, said brake shaft having a female coupling with an axially extending slit; and a collar disposed about said female coupling.

15. The brake of claim 9 wherein an axial center of said pole is intermediate said first and second axial ends of said armature.

16. The brake of claim 9 wherein said first engagement element comprises a plurality of teeth.

17. The brake of claim 9 wherein said first engagement element comprises a brake shoe.

18. The brake of claim 9, further comprising a fan mounted to said brake drum.

19. A brake, comprising:

a magnet shell disposed about a first axis, said magnet shell including first and second radially outwardly extending poles;

first and second armatures disposed radially outwardly of said first and second poles, respectively, each of said first and second armatures pivotable at a first axial end and each of said first and second armatures including a first engagement element coupled to said armature at a second axial end;

first and second springs disposed about said first and second poles, respectively, said first and second springs each biasing a respective one of said first and second armatures radially outwardly to urge said first engagement element of said one armature towards a second engagement element;

first and second coils disposed about said first and second poles, respectively; and means for selectively energizing said first and second coils to urge said first and second armatures radially inwardly and each of said first engagement elements away from said second engagement element.

20. The brake of claim 19, further comprising:

first and second bobbins disposed about said first and second poles, respectively, each of said first and second bobbins having a substantially cylindrical body portion extending along a second axis and having first and second ends; and first and second discs extending radially outwardly relative to said second axis from said first and second ends of said body portion, respectively wherein said first bobbin includes a first coupling pin extending axially relative to said second axis from said first disc of said first bobbin and said second bobbin includes a first female coupling extending axially relative to said second axis from said first disc of said second bobbin, said first female coupling configured to receive said first coupling pin.

21. The brake of claim 20 wherein said second bobbin includes a second pin extending axially relative to said second axis from said first disc of said second bobbin and said first bobbin includes a second female coupling extending axially relative to said second axis from said first disc of said first bobbin, said second female coupling configured to receive said second pin.

22. The brake of claim 19 wherein an axial center of said first pole is intermediate said first and second axial ends of said first armature.

23. An electromagnetic assembly, comprising:

a magnet shell having
a body portion; and,
a pole extending outwardly from a first surface of said body portion; and, a bobbin having
a substantially cylindrical body portion disposed about said first pole and extending along a longitudinal axis, said body portion of said bobbin having first and second ends; and,
first and second discs extending radially outwardly from said first and second ends, respectively wherein said body portion of said bobbin includes a radially inwardly extending flange disposed at said first end of said body portion and said first disc includes a first axially extending projection, said first projection configured to be received within an aperture in said first surface of said body portion of said magnet shell.

24. The electromagnetic assembly of claim 23, further comprising a spring that urges said flange against said first surface of said body portion of said magnet shell.

25. The electromagnetic assembly of claim 23 wherein said flange is annular.

26. The electromagnetic assembly of claim 23 wherein said first disc includes a second axially extending projection.

* * * * *